US011525921B2

(12) United States Patent
Leech et al.

(10) Patent No.: US 11,525,921 B2
(45) Date of Patent: Dec. 13, 2022

(54) TIME OF FLIGHT SENSOR ARRANGEMENT FOR ROBOT NAVIGATION AND METHODS OF LOCALIZATION USING SAME

(71) Applicant: SharkNinja Operating, LLC, Needham, MA (US)

(72) Inventors: Adam Leech, Newton, MA (US); Frederick K. Hopke, Medway, MA (US); Isaku D. Kamada, Brighton, MA (US)

(73) Assignee: SharkNinja Operating LLC, Needham, MA (US)

( * ) Notice: Subject to any disclaimer, the term of this patent is extended or adjusted under 35 U.S.C. 154(b) by 559 days.

(21) Appl. No.: 16/374,714

(22) Filed: Apr. 3, 2019

(65) Prior Publication Data

US 2019/0302793 A1    Oct. 3, 2019

Related U.S. Application Data

(60) Provisional application No. 62/651,766, filed on Apr. 3, 2018.

(51) Int. Cl.
*G01S 17/00* (2020.01)
*G01S 17/87* (2020.01)
(Continued)

(52) U.S. Cl.
CPC ............ *G01S 17/87* (2013.01); *G01S 17/931* (2020.01); *G05D 1/0219* (2013.01); *G05D 1/0242* (2013.01); *G05D 2201/0215* (2013.01)

(58) Field of Classification Search
CPC ..... G01S 17/87; G01S 17/931; G05D 1/0219; G05D 1/0242; G05D 2201/0215
See application file for complete search history.

(56) References Cited

U.S. PATENT DOCUMENTS 2,751,030 A    6/1956 Null
3,629,796 A    12/1971 Brownscombe et al.
(Continued)

FOREIGN PATENT DOCUMENTS

CN    201602713 U    10/2010
CN    102039595 A    5/2011
(Continued)

OTHER PUBLICATIONS

US 8,275,482 B2, 09/2012, Casey et al. (withdrawn)
(Continued)

*Primary Examiner* — Truc M Do
(74) *Attorney, Agent, or Firm* — Grossman Tucker Perreault & Pfleger, PLLC (57) ABSTRACT

In general, the present disclosure is directed to a time of flight (ToF) sensor arrangement that may be utilized by a robot (e.g., a robot vacuum) to identify and detect objects in a surrounding environment for mapping and localization purposes. In an embodiment, a robot is disclosed that includes a plurality of ToF sensors disposed about a housing of the robot. Two or more ToF sensors may be angled/aligned to establish overlapping field of views to form redundant detection regions around the robot. Objects that appear therein may then be detected by the robot and utilized to positively identify, e.g., with a high degree of confidence, the presence of the object. The identified objects may then be utilized as data points by the robot to build/update a map. The identified objects may also be utilized during pose routines that allow the robot to orient itself within the map.

11 Claims, 6 Drawing Sheets

(51) Int. Cl.
*G05D 1/02* (2020.01)
*G01S 17/931* (2020.01)

(56) References Cited

U.S. PATENT DOCUMENTS

| | | |
|---|---|---|
| 3,881,568 A | 5/1975 | Ando et al. |
| 4,028,533 A | 6/1977 | Matsubara |
| 4,119,900 A | 10/1978 | Kremnitz |
| 4,133,404 A | 1/1979 | Griffin |
| 4,282,430 A | 8/1981 | Hatten et al. |
| 4,412,129 A | 10/1983 | Duncan |
| 4,479,053 A | 10/1984 | Johnston |
| 4,502,773 A | 3/1985 | Gaewsky et al. |
| 4,532,867 A | 8/1985 | Mitchell |
| 4,556,313 A | 12/1985 | Miller, Jr. et al. |
| 4,558,215 A | 12/1985 | Kaneko et al. |
| 4,611,292 A | 9/1986 | Ninomiya et al. |
| 4,627,511 A | 12/1986 | Yajima |
| 4,659,922 A | 4/1987 | Duncan |
| 4,668,859 A | 5/1987 | Winterer |
| 4,674,048 A | 6/1987 | Okumura |
| 4,703,240 A | 10/1987 | Yoshimoto et al. |
| 4,752,799 A | 6/1988 | Stauffer |
| 4,893,025 A | 1/1990 | Lee |
| 4,920,520 A | 4/1990 | Goebel et al. |
| 4,996,468 A | 2/1991 | Field et al. |
| 5,109,161 A | 4/1992 | Horiuchi et al. |
| 5,122,796 A | 6/1992 | Beggs et al. |
| 5,187,361 A | 2/1993 | Ishii |
| 5,245,177 A | 9/1993 | Schiller |
| 5,254,853 A | 10/1993 | Reich |
| 5,276,618 A | 1/1994 | Everett, Jr. |
| 5,319,611 A | 6/1994 | Korba |
| 5,341,540 A | 8/1994 | Soupert et al. |
| 5,353,224 A | 10/1994 | Lee et al. |
| 5,377,106 A | 12/1994 | Drunk et al. |
| 5,396,070 A | 3/1995 | Lee |
| 5,418,359 A | 5/1995 | Juds et al. |
| 5,550,369 A | 8/1996 | Skell et al. |
| 5,621,291 A | 4/1997 | Lee |
| 5,652,489 A | 7/1997 | Kawakami |
| 5,933,225 A | 8/1999 | Yamabuchi |
| 5,935,179 A | 8/1999 | Kleiner et al. |
| 5,995,883 A | 11/1999 | Nishikado |
| 6,023,814 A | 2/2000 | Imamura |
| 6,094,158 A | 7/2000 | Williams |
| 6,169,572 B1 | 1/2001 | Sogawa |
| 6,317,202 B1 | 11/2001 | Hosokawa et al. |
| 6,433,329 B1 | 8/2002 | Butka et al. |
| 6,493,612 B1 | 12/2002 | Bisset et al. |
| 6,594,844 B2 | 7/2003 | Jones |
| 6,603,103 B1 | 8/2003 | Ulrich et al. |
| 6,703,599 B1 | 3/2004 | Casebolt et al. |
| 6,925,679 B2 | 8/2005 | Wallach et al. |
| 7,002,550 B2 | 2/2006 | Casebolt et al. |
| 7,155,308 B2 | 12/2006 | Jones |
| 7,237,298 B2 | 7/2007 | Reindle et al. |
| 7,312,854 B2 | 12/2007 | Sugiyama et al. |
| 7,403,269 B2 | 7/2008 | Yamashita et al. |
| 7,429,843 B2 | 9/2008 | Jones et al. |
| 7,430,455 B2 | 9/2008 | Casey et al. |
| 7,486,386 B1 | 2/2009 | Holcombe et al. |
| 7,499,775 B2 | 3/2009 | Filippov et al. |
| 7,663,333 B2 | 2/2010 | Jones et al. |
| 7,706,921 B2 | 4/2010 | Jung |
| 7,738,733 B2 | 6/2010 | DePue et al. |
| 7,856,291 B2 | 12/2010 | Jung et al. |
| 7,884,733 B2 | 2/2011 | ODowd et al. |
| 7,978,315 B2 | 7/2011 | Lee |
| 8,030,914 B2 | 10/2011 | Alameh et al. |
| 8,050,876 B2 | 11/2011 | Feen et al. |
| 8,301,304 B2 | 10/2012 | Jung et al. |
| 8,306,662 B2 | 11/2012 | Kim |
| 8,310,585 B2 | 11/2012 | Lee et al. |
| 8,396,592 B2 | 3/2013 | Jones et al. |
| 8,401,279 B2 | 3/2013 | Sugino et al. |
| 8,412,377 B2 | 4/2013 | Casey et al. |
| 8,463,438 B2 | 6/2013 | Jones et al. |
| 8,473,187 B2 | 6/2013 | Kammel et al. |
| 8,478,442 B2 | 7/2013 | Casey et al. |
| 8,489,234 B2 | 7/2013 | Rew et al. |
| 8,516,651 B2 | 8/2013 | Jones et al. |
| 8,565,920 B2 | 10/2013 | Casey et al. |
| 8,577,538 B2 | 11/2013 | Lenser et al. |
| 8,600,553 B2 | 12/2013 | Svendsen et al. |
| 8,648,702 B2 | 2/2014 | Pala |
| 8,744,122 B2 | 6/2014 | Salgian et al. |
| 8,761,935 B2 | 6/2014 | Casey et al. |
| 8,788,092 B2 | 7/2014 | Casey et al. |
| 8,800,101 B2 | 8/2014 | Kim et al. |
| 8,838,274 B2 | 9/2014 | Jones et al. |
| 8,958,911 B2 | 2/2015 | Wong et al. |
| 8,996,172 B2 | 3/2015 | Shah et al. |
| 9,025,019 B2 | 5/2015 | Meinherz et al. |
| 9,063,010 B2 | 6/2015 | Wu |
| 9,180,596 B2 | 11/2015 | Sim et al. |
| 9,223,312 B2 | 12/2015 | Goel et al. |
| 9,223,440 B2 | 12/2015 | Lim et al. |
| 9,247,171 B2 | 1/2016 | Ebisumoto et al. |
| 9,271,621 B2 | 3/2016 | Park et al. |
| 9,283,670 B2 | 3/2016 | Sun et al. |
| 9,287,864 B2 | 3/2016 | Buttolo et al. |
| 9,327,407 B2 | 5/2016 | Jones et al. |
| 9,337,832 B2 | 5/2016 | Buttolo et al. |
| 9,405,008 B2 | 8/2016 | Raskar et al. |
| 9,417,059 B2 | 8/2016 | Go et al. |
| 9,436,185 B2 | 9/2016 | Schnittman |
| 9,440,652 B1 | 9/2016 | Ferguson et al. |
| 9,446,521 B2 | 9/2016 | Casey et al. |
| 9,453,743 B2 | 9/2016 | Lee et al. |
| 9,483,055 B2 | 11/2016 | Johnson et al. |
| 9,613,406 B2 | 4/2017 | Chen et al. |
| 9,625,571 B1 | 4/2017 | Yamazaki |
| 9,638,800 B1 | 5/2017 | Skowronek et al. |
| 9,638,801 B2 | 5/2017 | Boufounos et al. |
| 9,720,086 B1 | 8/2017 | Skowronek et al. |
| 9,739,874 B2 | 8/2017 | Lee |
| 9,785,148 B2 | 10/2017 | Yun |
| 9,918,600 B2 | 3/2018 | Oka et al. |
| 2004/0236468 A1 | 11/2004 | Taylor et al. |
| 2005/0154503 A1 | 7/2005 | Jacobs |
| 2005/0234612 A1 | 10/2005 | Bottomley et al. |
| 2008/0125907 A1 | 5/2008 | Lee et al. |
| 2014/0188325 A1* | 7/2014 | Johnson ............ G05D 1/0027 701/26 |
| 2016/0279808 A1 | 9/2016 | Doughty et al. |
| 2017/0023942 A1 | 1/2017 | Johnson et al. |
| 2017/0031366 A1 | 2/2017 | Shamlian et al. |
| 2017/0307759 A1* | 10/2017 | Pei ..................... G06T 7/521 |
| 2018/0078106 A1* | 3/2018 | Scholten ............. A47L 9/1683 |
| 2018/0302611 A1* | 10/2018 | Baak .................... G01S 17/894 |
| 2019/0038099 A1 | 2/2019 | Hoshino |

FOREIGN PATENT DOCUMENTS

| | | |
|---|---|---|
| CN | 102866433 A | 1/2013 |
| CN | 104216404 A | 12/2014 |
| CN | 104750105 A | 7/2015 |
| CN | 104977926 A | 10/2015 |
| DE | 1902038 A1 | 8/1970 |
| DE | 3730105 A1 | 3/1989 |
| DE | 4405865 A1 | 8/1995 |
| DE | 19615712 A1 | 12/1997 |
| EP | 0265542 A1 | 5/1986 |
| EP | 0216364 A2 | 4/1987 |
| EP | 0505028 A2 | 9/1992 |
| EP | 0522200 A2 | 1/1993 |
| EP | 0523185 B1 | 1/1993 |
| GB | 2166315 A | 4/1986 |
| GB | 2344650 A | 6/2000 |
| JP | S58221925 A | 12/1983 |
| JP | S6263315 A | 3/1987 |
| JP | S62109528 A | 5/1987 |
| JP | H0358105 A | 3/1991 |

(56) References Cited

FOREIGN PATENT DOCUMENTS

| JP | H03286310 A | 12/1991 |
|---|---|---|
| JP | H05084200 A | 4/1993 |
| KR | 100638220 B1 | 10/2006 |
| KR | 20090098513 A | 9/2009 |
| WO | 1988004081 | 6/1988 |
| WO | 9115872 A1 | 10/1991 |
| WO | 9905661 A1 | 2/1999 |
| WO | 0038026 A1 | 6/2000 |
| WO | 0136772 A1 | 5/2001 |
| WO | 0142867 A1 | 6/2001 |
| WO | 2005077240 A2 | 8/2005 |
| WO | 2017130590 | 8/2017 |
| WO | 2018040607 A1 | 3/2018 |

OTHER PUBLICATIONS

PCT Search Report and Written Opinion dated Jun. 26, 2019, received in PCT Application No. PCT/US19/25671, 11 pgs.
IRobot, 900 Series Owner's Manual, www.irobot.com, published 2017, 13 pgs.
IRobot Roomba 500/600/700/800 Wall Sensor Bumper IR Array, www.amazon.com, 2019, 4 pgs.
IRobot Roomba 900 960 980 Wall Sensor Bumper IR Array Genuine, www.ebay.com, published 2019, 1 pg.
Robot Shop Community, Chaper 12: How to replace Roomba 500 Series Light-Touch Bumper Array, www.robotshop.com, published 2012, 16 pgs.
Third Party Submission filed on Oct. 8, 2019 in U.S. Appl. No. 16/374,714, 13 pgs.
Everett, H.R. et al, "Modeling the Environment of a Mobile Security Robot", Naval Ocean Systems Center, Jun. 1990, pp. 1-170, Technical Document 1835, San Diego, CA (ADA233074).
Braunsting et al, "Fuzzy Logic Wall Following of a Mobile Robot Based on the Concept of General Perception", IKERLAN Centro de Investigaciones Tecnologicas, International Conference on Advanced Robotics, (Sep. 1995).
Ciccimaro, Dominic et al, "Automated security response robot", Proc. SPIE 3525, Mobile Robots XIII and Intelligent Transportation Systems, SPAWAR Systems Center, Code D371, San Diego, CA, (Jan. 8, 1999); doi 10.1117/12.335728.
Everett, H.R., "Sensors for Mobile Robots Theory and Application", Naval Command, Control and Ocean Surveillance Center, A K Peters, LTD, (1995), pp. 96-98.
The Electrolux Group, Trilobit Manual, Sep. 28, 2001, 10 pages.
Electrolux Trilobite 2.0—Disassembling, Photos, RobotReviews.com, Mar. 7, 2020, 13 pages.
CPU-ZILLA, Electrolux Trilobite, "Welcome to Paleozoic Park . . . Not Quite", HardwareZone.com, Jimmy Tang, Mar. 25, 2003, 2 pages.
CPU-ZILLA, Electrolux Trilobite, "Life's Better With Auto-Vacuuming", HardwareZone.com, Jimmy Tang, Mar. 25, 2003, 3 pages.
CPU-ZILLA, Electrolux Trilobite, "Things to Consider", HardwareZone.com, Jimmy Tang, Mar. 25, 2003, 3 pages.
CPU-ZILLA, Electrolux Trilobite, "Final Words", HardwareZone.com, Jimmy Tang, Mar. 25, 2003, 2 pages.
Everett, H.R., "Survey of Collision Avoidance and Ranging Sensors for Mobile Robots", Naval Ocean Systems Center, Mar. 1988, pp. 1-87, Technical Report 1194, San Diego, CA.
Flynn, "Redundant Sensors for Mobile Robot Navigation", Massachusetts Institute of Technology, Oct. 1985, 73 pages, (ADA161087).
Connell, Jonathan H., "Extending the Navigation Metaphor to Other Domains", IBM T.J. Watson Research Center, AAAI Technical Report FS-92-02, (1992), 7 pages.
Roening, Juha et al, "Obstacle detection using a light-strip-based method", Proc. SPIE 3023, Three-Dimensional Image Capture, University of Oulu, Finland, (Mar. 21, 1997); doi: 10.1117/12.269765, 10 pages.
Schwartz, Ingo "PRIMUS: an autonomous driving robot", Proc. SPIE 3693, Unmanned Ground Vehicle Technology, DaimlerChrysler Aerospace, Germany, (Jul. 22, 1999); doi: 10.1117/12.354443, 11 pages.
Borenstein, J. et al, "Where am I?" Sensors and Methods for Mobile Robot Positioning, University of Michigan, (Apr. 1996), 282 pages.
Everett, H.R., "Sensors for Mobile Robots Theory and Application", Naval Command, Control and Ocean Surveillance Center, A K Peters, LTD, Wellseley, MA (1995), 543 pages.
Everett. H.R., "A microprocessor controlled autonomous sentry robot", A thesis presented to the Naval Postgraduate School, Calhoun International Archive, Monteray, CA, (Oct. 1982).
Benet et al., "Using infrared sensors for distance measurement in mobile robots", Robotics and Autonomous Systems 1006 (2002) 1-12), Elsevier Science, 12 pages.
Viggh, et al. "Infrared People Sensors for Mobile Robots", Proc. SPIE 1007, Mobile Robots III, (Mar. 10, 1989); doi: 10.117/12.949118, 9 pages.
Extended European Search Report dated Nov. 21, 2022, received in European Patent Application No. 19781940.2, 15 pages.
IRobot, 900 Series Owner's Manual, published 2017, available via irobot.com.†
Amazon, 2019, available via amazon.com.†
Ebay, published 2019, available via ebay.com.†
Robot Shop Community, Chapter 12: How to replace Roomba 500 Series Light-Tough Bumper Array, published 2012, available via robotshop.com.†

\* cited by examiner
† cited by third party

TIME OF FLIGHT SENSOR ARRANGEMENT FOR ROBOT NAVIGATION AND METHODS OF LOCALIZATION USING SAME

CROSS REFERENCE TO RELATED APPLICATIONS

The present application claims the benefit of U.S. Provisional Patent Application Ser. No. 62/651,766 filed on Apr. 3, 2018, which is fully incorporated herein by reference.

TECHNICAL FIELD

The present disclosure relates to robot navigation systems, and more particularly, to a sensor arrangement for use in robotic devices such as robotic surface cleaning device that utilizes time of flight sensors (ToF) for navigation and localization.

BACKGROUND INFORMATION

Some navigation approaches for robotic devices includes utilizing imaging systems to identify objects in an environment for mapping and localization purposes. Such systems may include one or more image sensors to perform object detection, wall tracking, and so on. For example, such systems may include multiple image sensors that each have a different field of view.

One such navigation and localization approach includes utilizing a simultaneous localization and mapping (SLAM) algorithm with image sensor data as an input. Often, multiple image sensors get utilized to ensure that front, back, and side views get captured for purposes of ensuring that environmental features/obstructions are factored into navigation decisions. Multiple image sensors can be particularly important when a robotic device can move in potentially any direction based on rotation about a center axis of the same. This ensures that the robotic device collects a sufficient amount of environmental data from each field of view to prevent collisions, falling down stairs, and so on. However, image sensors increase both cost and complexity in manufacturing robotic devices, as well as necessitate having sufficient hardware/software resources to capture and process multiple simultaneous image data streams.

BRIEF DESCRIPTION OF THE DRAWINGS

These and other features and advantages will be better understood by reading the following detailed description, taken together with the drawings wherein.

DETAILED DESCRIPTION

In general, the present disclosure is directed to a time of flight (ToF) sensor arrangement that may be utilized by a robot device, e.g., a robotic surface cleaning device (or vacuum) or other robotic device, to identify and detect objects in a surrounding environment for mapping and localization purposes. In an embodiment, a robot is disclosed that includes a plurality of ToF sensors disposed about a housing of the robot. Two or more ToF sensors may be angled/aligned to establish at least partially overlapping field of views to form redundant detection regions around the robot. Objects that appear simultaneously, or nearly simultaneously, may then be detected by the robot and utilized to positively identify, e.g., with a high degree of confidence, the presence of an object. The identified objects may then be utilized as data points by the robot to build/update a map. The identified objects may also be utilized during pose routines that allow the robot to orient itself within the map with a high degree of confidence.

Although the following aspects and embodiments specifically reference robotic vacuums, this disclosure is not limited in this regard. The following disclosure is equally applicable to any type of robot that seeks to intelligently understand and traverse an environment by identifying objects/features, e.g., furniture, walls, toys, people, pets, and so on, and their position in the environment. In addition, the ToF sensor arrangement disclosed variously herein may be utilized in a robot without an image sensor system for object identification/tracking, or alternatively, may be used in combination with an image sensor system.

The ToF sensor arrangement disclosed herein allows for environmental information to be collected in a relatively simple manner that can be used alone or in combination with other sensory such as image sensors. When used as a replacement for image sensors, the ToF sensor arrangement advantageously significantly reduces cost, complexity and computational load on hardware resources of the robotic device.

As generally referred to herein, a ToF sensor refers to any sensor device capable of measuring the relative distance between the sensor and an object in an environment. Preferably, infrared-type ToF sensors may be utilized, wherein each infrared ToF sensor includes an IR transmitter and receiver. However, other sensor types may be utilized such as acoustic ToF sensors that emit and receive sound waves, e.g., ultrasound, for measurement purposes.

Figure 1:
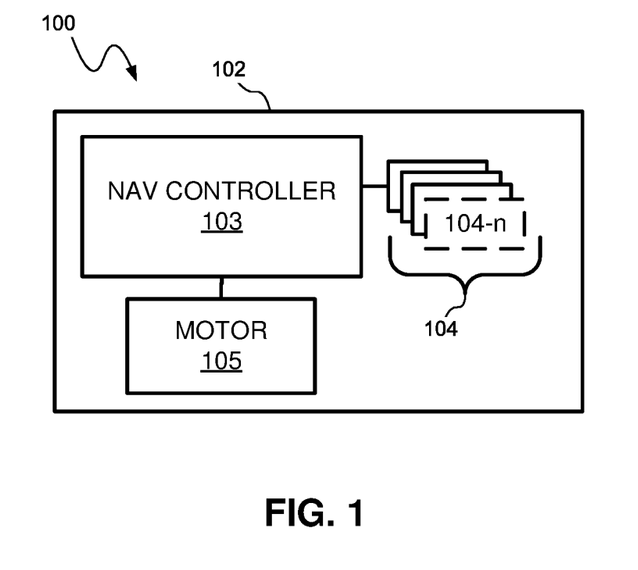
FIG. 1 is a block diagram of an example robot navigation system consistent with an embodiment of the present disclosure.
Figure 2A:
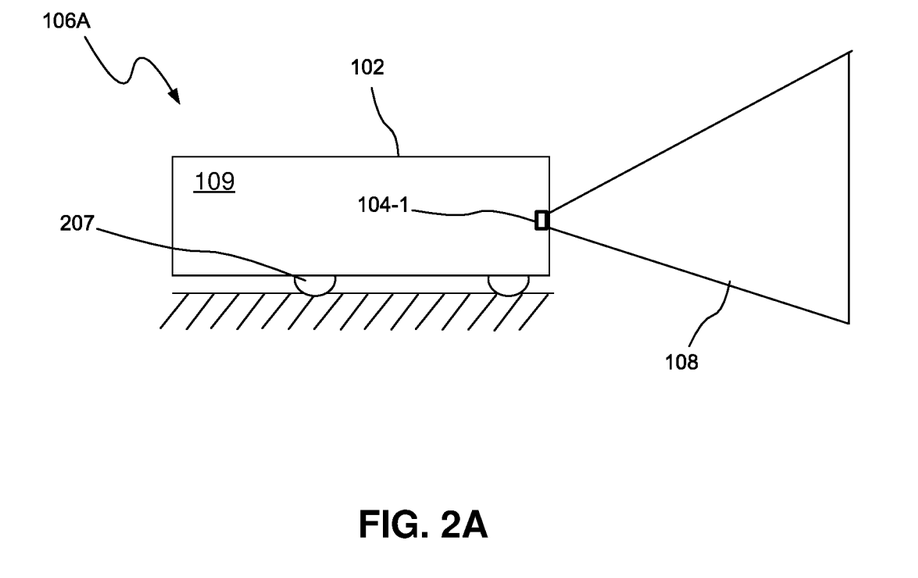
FIG. 2A is a side view of a robot vacuum implementing the example robot navigation system of FIG. 1 in accordance with an embodiment of the present disclosure.

Referring now to FIG. 1, a block diagram illustrates an example robot navigation system 100 in accordance with an embodiment of the present disclosure. The robot navigation system 100 includes a housing 102, a navigation controller 103, a plurality of time of flight (ToF) sensors shown collectively as 104 and individually as 104-1 to 104-n, and a motor 105. The navigation controller 103 may comprise any number of chips, circuitry, and sensory for support robot functions such as field programmable gate arrays (FPGA), processors, memory, gyroscopes, and inertial sensors/acceleration sensors, and so on. The navigation controller (or simply controller) is not necessarily limited to navigation functions and may generally control all aspects of the robot including cleaning processes. The navigation controller 103 may implement routines such as Simultaneous Localization and Mapping (SLAM) or any other suitable navigation routine. The motor 105 may be controllable via signaling from the navigation controller 103 and may comprise one or more motors for driving wheels 107 (FIG. 2) to cause the robot to travel along a surface. The wheels 107 may be implemented as a tread driving gear/wheel, and the particular example wheels shown in FIG. 2 should not be construed as limiting.

The housing 102 may have any shape and is not necessarily limited to the shape shown in the figures (e.g., circular). For example, the housing 102 may have a square shape, a D-shape, a triangular shape, a circular shape, a hexagonal shape, a pentagonal shape, and/or any other suitable shape. In some instances, the positioning of the ToF sensors 104, relative to the housing 102, may be based, at least in part, on the shape of the housing 102.

Each of the plurality of time of flight sensors 104-1 to 104-*n* may comprise any sensor capable of measuring relative distance between the sensor and an object in a surrounding environment and converting the same into a representational electrical signal. For example, the time of flight sensors 104-1 to 104-*n* may comprise infrared laser-type sensors that utilize infrared wavelengths to output a measurement distance signal, which may be referred to herein as simply a measurement signal. In other examples, the time of flight sensors 104-1 to 104-*n* may comprise sensors capable of measuring distance acoustically via soundwaves, e.g., ultrasound. In any event, the time of flight sensors 104-1 to 104-*n* may comprise short-range sensors capable of measurements from a few centimeters to a meter, or long-range sensors capable of measurements from 1 meter to hundreds of meters, or a combination of both short and long-range ToF sensors.

As discussed in further detail below, the navigation controller 103 may receive measurement signals from the ToF sensors 104-1 to 104-*n* to identify objects the environment of the robot. In an embodiment, the location of the identified objects relative to a known position of the robot may be utilized to update/build a map from a point cloud, e.g., a plurality of points that may utilized to generate a map. The identified objects may also be utilized to calculate robot odometry and pose in order to localize the robot within the map. The ToF sensors 104-1 to 104-*n* may be used exclusively to identify objects in an environment, e.g., without the aid of image sensors or other like device, or may be used in combination with image sensor(s).

FIG. 2A shows a side perspective view of an example embodiment 106A of the robot navigation system 100 implemented in a robot 109. As shown, the robot 109 is a vacuum-type robot including a nozzle and dust cup (not shown) for dirt collection. The housing 102 of the robot 109 includes a plurality of ToF sensors, which are more clearly shown in FIGS. 4-8, but for ease of explanation and clarity the embodiment of FIG. 2A shows a single forward-facing ToF 104-1. As generally referred to herein, forward-facing refers to a direction which is substantially parallel (or forms an acute angle) with an imaginary line representing the direction of travel for the robot as the same moves forward during operation (see FIG. 3). On the other hand, rearward-facing as generally used herein refers to a direction which is substantially parallel (or forms an acute angle) with an imaginary line representing the direction of travel for the robot as the same moves in reverse during operation.

Figure 3:
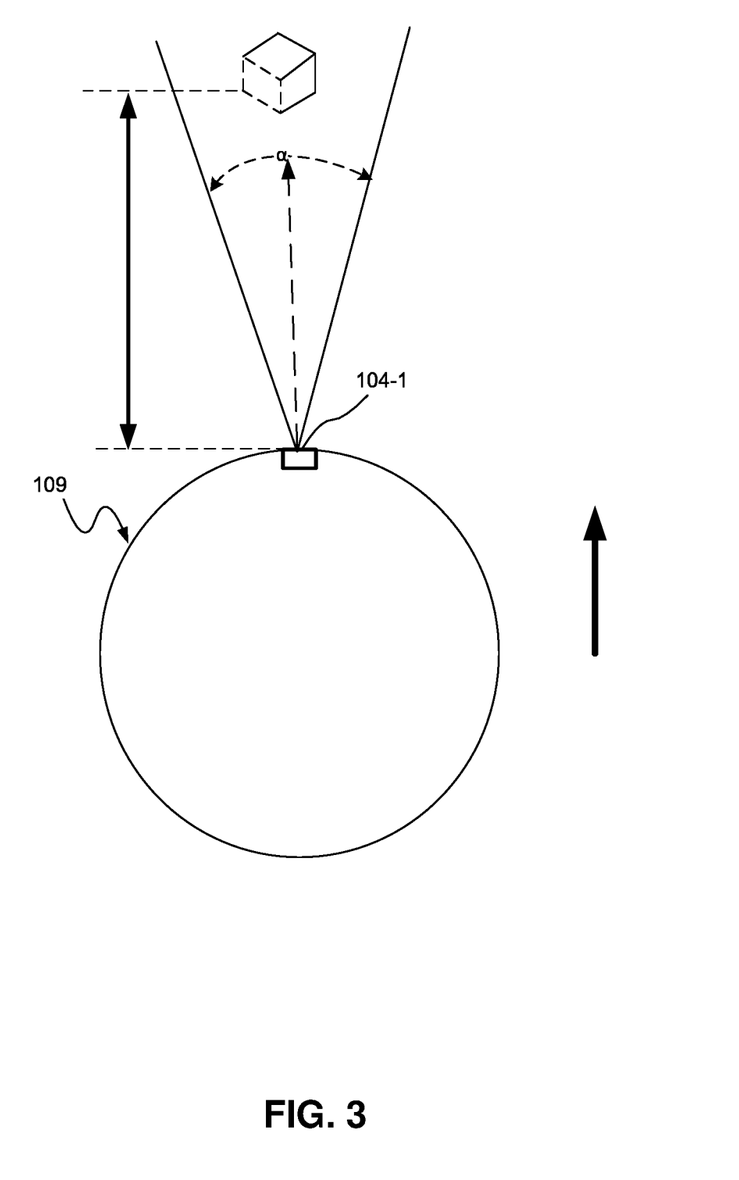
FIG. 3 is a top view of a robot vacuum consistent with an embodiment of the present disclosure.

The ToF 104-1 includes a field of view (FOV) 108 which can have a generally conical shape. Each FOV may also be referred to herein as detection regions. When observed from the top, e.g., as shown in FIG. 3, the ToF 104-1 may include a relatively narrow angle α. In an embodiment, the angle α of each of the FOVs for the ToF sensors is about 15 degrees, although other configurations are within the scope of this disclosure. For example, each FOV can include relatively wide-angled FOVs, e.g., 65 degrees or more, or relatively narrow angled FOVs, e.g., under 65 degrees, or a combination of different angles such that one or more ToF sensors have a FOV with a first angle that is greater than one or more other TOFs sensors with a second angle.

Figure 2B:
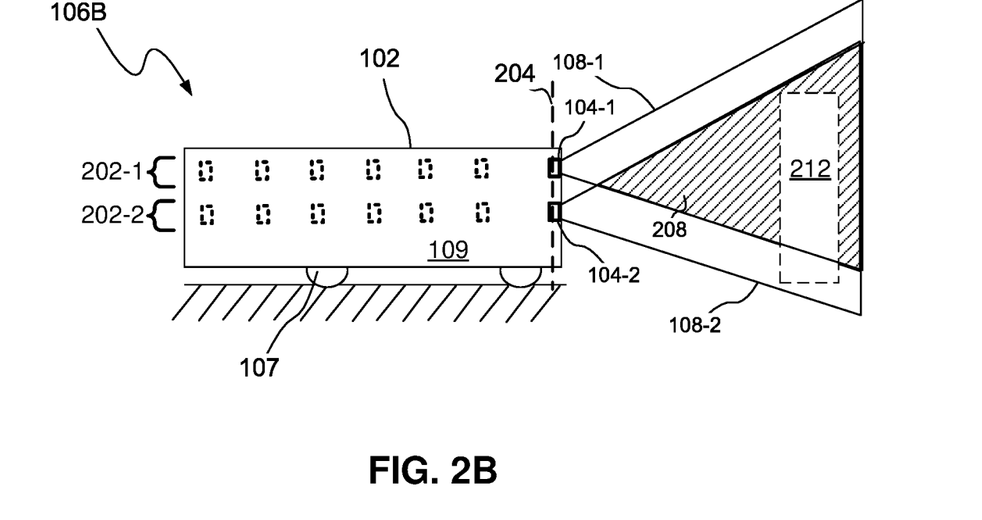
FIG. 2B is a side view of a robot vacuum implementing the example robot navigation system of FIG. 1 in accordance with an embodiment of the present disclosure.

Turning to FIG. 2B, another example embodiment 106B of the robot 109 is shown. As shown, the robot 109 includes at least two ToF sensors, namely first and second ToF sensors 104-1 and 104-2. In this embodiment, the ToF sensors 104-1 and 104-2 may be disposed in vertical alignment with each other such that an imaginary line drawn 204 substantially transverse from the surface to be cleaned intersects both the first and second ToF sensors 104-1 and 104-2. Each FOV 108-1, 108-2 of the first and second ToF sensors 104-1, 104-2 may then at least partially overlap, as shown.

This configuration shown in FIG. 2B therefore be referred to as a vertically stacked ToF arrangement, whereby the FOV of two or more vertically-aligned sensors may be utilized to allow the robot navigation system 100 to determine a height of objects that appear within each associated FOV. In one example, height may be determined for an object by the robot navigation system 100 detecting object 212 in the overlapping region 208 of each of the first and second FOVs 108-1, 108-2. The height of the detected object 212 may then be determined based on a relatively simple calculation that utilizes the height/position of each of the first and second ToF sensors 104-1, 104-2 relative to a known reference point (e.g., the surface to be cleaned or the body 102), the relative distance from the robot 109 to the object 212, the geometry of the first and second FOVs 108-1, 108-2, and more particularly, the geometry and dimensions of the overlapping region.

Thus, in response to the object appearing in the overlapping region 210, a height determination for the object 212 may then be calculated. The calculated height for the object 212 may then be used by the robot navigation system 100 during localization and navigation. For example, height determinations by the robot navigation system 100 using the vertically-stacked ToF arrangement may be advantageously utilized to distinguish between objects/obstructions in an environment that can be navigated around, e.g., furniture, toys, and so on, by the robot 109 versus objects/obstructions that cannot be navigated around such as walls and windows.

Each of the first and second ToF sensors 104-1, 104-2 may optionally be part of first and second ToF arrays 202-1, 202-2. Each of the ToF sensors in the second ToF arrays 202-1, 202-2 can include ToF sensors disposed in a uniform manner relative to each other about the body 102 of the robot, such as shown, or may be disposed at varying distances relative to each other. As further shown in FIG. 2B, each of the ToF sensors of the first array of ToF sensors 202-1 may be vertically aligned with corresponding ToF sensors of the second array of ToF sensors 202-2. Each pair of sensors vertically-aligned in this manner can be configured to have overlapping FOVs, as discussed above. Accordingly, the first and second arrays of ToF sensors 202-1, 202-2 may allow for height determinations in multiple directions about the robot 109, e.g., up to 360 degrees around the body 102 of the robot 109.

Figure 2C:
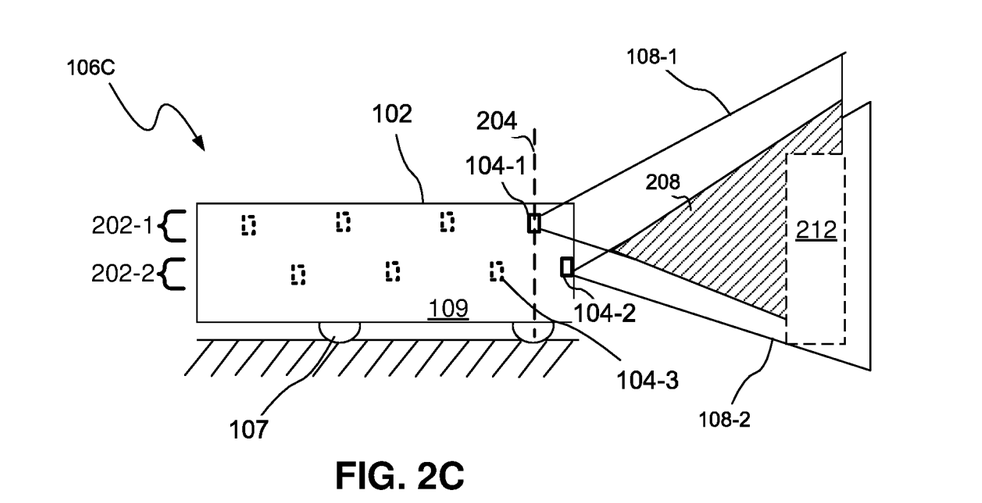
FIG. 2C is a side view of a robot vacuum implementing the example robot navigation system of FIG. 1 in accordance with an embodiment of the present disclosure.

FIG. 2C shows another example embodiment 106C of the robot 109. As shown, the robot 109 includes at least two ToF sensors, namely first and second ToF sensors 104-1 and 104-2, in a staggered configuration. In this embodiment, the ToF sensors 104-1 and 104-2 may be disposed in a displaced/staggered arrangement such that that an imaginary line drawn 204 substantially transverse from the surface to be cleaned intersects with only one of the first and second ToF sensors 104-1 and 104-2. Each FOV 108-1, 108-2 of the first and second ToF sensors 104-1, 104-2 can overlap, as shown, for height detection purposes of discussed above.

In addition, each of the first and second ToF sensors 104-1, 104-2 may optionally be part of first and second ToF arrays 202-1, 202-2, respectively. In this embodiment, the first and second ToF arrays 202-1, 202-2 may be disposed in a staggered manner. To this end, the robot navigation system 100 may utilize overlapping FoVs from the first and second ToF sensors 104-1, 104-2, or from first and third ToF sensors 104-1, 104-3. Accordingly, this staggered configuration provides the robot navigation system 100 with flexibility as to which combinations of sensors, and by extension, which overlapping FOVs to utilize when calculating heights of objects/instructions within the same. Note while the embodiments of FIGS. 2B and 2C show two arrays of ToF sensors, this disclosure is not limited in this regard. The present disclosure is equally applicable to embodiments including N number of arrays such as, for instance, three, four, or five arrays of ToF sensors arranged in a vertically-aligned configuration, staggered configuration, or combination thereof.

As is known, light-based ToF sensors measure relative distances to objects by reflecting light off of an object and measuring the duration of time for the light to be reflected back to the sensor. These calculations operate, in part, based on the speed of light remaining constant. As a robot travels forward, the change of a reported distance combined with the time interval between the reported changes in distance may be used to calculate the real-time speed of the robot, for instance. Therefore, the speed of a robot may be given by the following equation:

$$\text{Robot speed} = \frac{\Delta \text{Distance}}{\Delta \text{Time}} \quad \text{Equation (1)}$$

Figure 4:
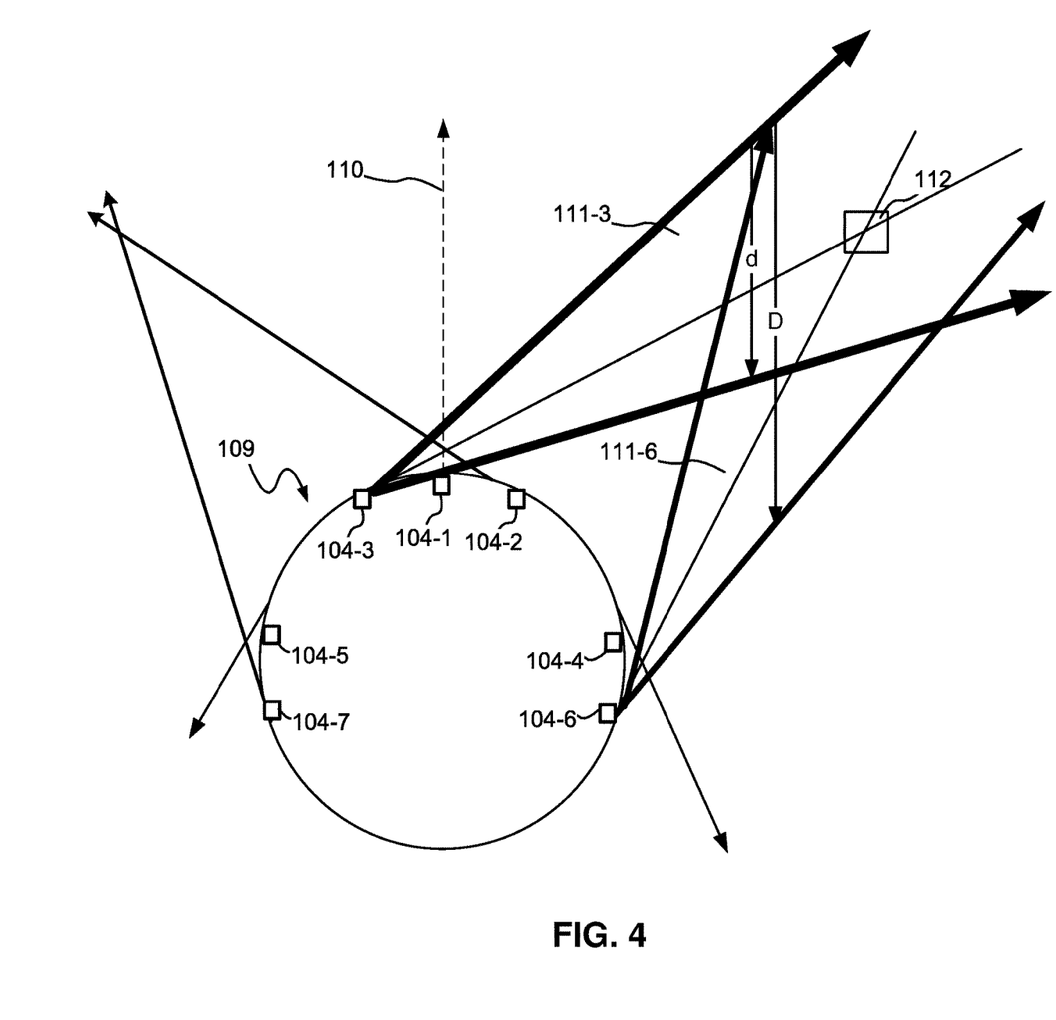
FIG. 4 is another top view of a robot vacuum consistent with an embodiment of the present disclosure.

FIG. 4 shows another example embodiment of the robot 109 consistent with the present disclosure. The robot 109 of FIG. 4 includes seven (7) sensors, namely ToF 104-1 to 104-7, although other numbers of sensors may be utilized and this is not intended to be limiting. For instance, the robot 109 may include two or more arrays of vertically stacked ToFs, as discussed above with regard to FIGS. 2B-2C. The ToFs 104-1 to 104-7 are disposed around the housing of the robot 109 at various locations. The spacing between sensors may be uniform, or may vary. As shown, the first ToF sensor 104-1 is forward facing and has a FOV that is substantially parallel with the direction of forward travel (represented by imaginary line 110) for the robot, which is shown more clearly in FIG. 5. Sensors 104-2 to 104-7 are also forward-facing but are arranged such that they have associated FOVs that are angled relative to an imaginary line 110 that represents a forward direction of travel for the robot 109.

In an embodiment, the angles of the FOV may allow for overlap of regions between the FOV for two or more ToF sensors. These overlapped regions may also be referred to as redundant detection regions. For example, the embodiment of FIG. 4 shows that the FOV 111-3 for the ToF sensor 104-3 overlaps the FOV 111-6 for the sensor 104-6. This overlapping arrangement may be utilized to establish predefined regions that allow for detection/identification of objects disposed in those redundant regions. In the event an object is affirmatively/positively identified in such a region, the information may be utilized to allow for tracking by a single sensor, e.g., sensor 104-3, even after the object is no longer in the FOV 111-6 of the ToF sensor 104-6, which is described in greater detail below.

In one specific example embodiment, the ToF 104-1 may be initially relied upon to track odometry. If the ToF 104-1 is not registering any objects, e.g., measurements are at or below a threshold floor value for distance, or tracking an object that has yet to enter the FOV of the other ToF sensors 104-2 to 104-7, the navigation controller 103 may utilize the other sensors that have overlapping FOVs to positively identify objects through multi-sensor detection, e.g., by sensors 104-3 and 104-6. In response to the detection of an object, the navigation controller 103 may "hand off" tracking to the ToF sensor with the FOV that is more likely to continue to have the object in view.

For example, consider a scenario where the navigation controller 103 detects object 112 simultaneously, or nearly simultaneously, entering the FOV 111-3 of ToF sensor 104-3 and the FOV 111-6 of ToF sensor 104-6. The robot 109 may then "hand off" tracking to the sensor 104-6 as the associated FOV 111-6 can continue to detect the object 112 over the entire distance D as the robot 109 moves along direction 110. On the other hand, the sensor 104-3 only remains capable of detecting object 112 for distance d before the same is outside the detection range of FOV 111-3. Accordingly, distance d represents the extent of the redundant region by which both ToF sensors 104-3 and 104-6 can track object 112 while distance D represents the extent of the entire region by which ToF sensor 104-6 can detect presence/distance of the object 112 (assuming forward movement along direction 110). In a general sense, this "handing off" allows for objects to be tracked by a single sensor with a relatively high degree of confidence that the object is present, and the relative distance of the robot 109 to the objects. This can be particularly advantageous when attempting to maintain a particular distance from an object such as a wall, furniture or other obstruction, or to otherwise adjust operation of the robot 109 based on the presence and distance of the object 112.

Alternatively, or in addition to the "hand off" scenario discussed above, the navigation controller 103 may continue to track objects via two or more ToF sensors. For example, in the embodiment of FIG. 4, the navigation controller 103 may use both ToF sensors 104-3 and 104-6 as a pair and triangulate relative distance to the object 112. These triangulated measurements may thus allow the navigation controller 103 to establish a higher confidence level during odometry calculations, map building/updating, and/or general navigation.

In any such cases, and in accordance with an embodiment, objects may be detected by the navigation controller 103 when two or more ToF sensors with overlapping FOVs output a measurement signal that indicates the presence of an object and its relative distance from the robot 109. In some cases, multiple measurements from each of the ToF sensors may be utilized by the navigation controller 103 to minimize or otherwise reduce instances of false positives. Thus, upon successive data points from each FOV (e.g., derived from the respective measurement signals), the navigation controller 103, and by extension the robot 109, can detect an object in the environment, optionally continue to track that object via one or more ToF sensors, and use those data points to increase the confidence of the robot odometry processes.

Figure 5:
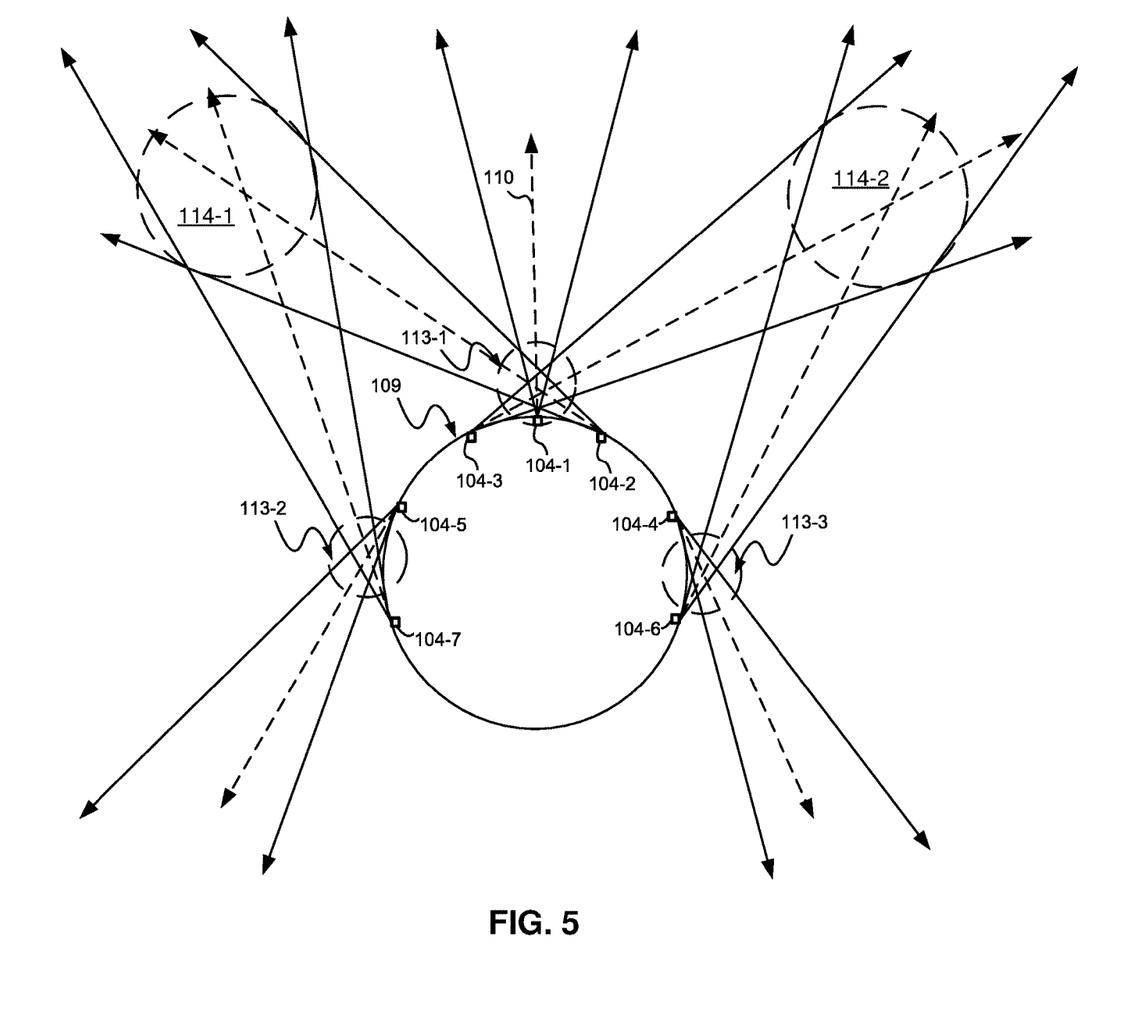
FIG. 5 is another top view of a robot vacuum consistent with an embodiment of the present disclosure.

FIG. 5 shows another example embodiment for the robot 109 wherein the ToF sensors form multiple redundant regions for detection. As shown, the ToF sensors can be arrayed to form a "detection halo" about the robot whereby multiple detection regions both proximate the robot 109, e.g., regions 113-1 to 113-3, and distant from the robot 109, e.g., regions 114-1 and 114-2, may be utilized for object detection/tracking. Notably, pairs of forward and rear-facing ToFs, e.g., 104-5 and 104-7; 104-4 and 104-6, may be utilized to create overlapping regions (e.g., regions 113-2 and 113-3) proximate to either side of the robot 109. These regions may therefore be used for object detection and mapping functions, as well as positive identification for objects to be used in odometry calculations. This configuration may also be accurately described as shared ToF detection (or ToF Redundancy), and may be utilized to positive identify objects with a high degree of confidence to store a representation of the same within a point cloud. The point cloud may then be utilized to map the environment about the robot. In some instances, the regions 113-2 and 113-3 may be used during obstacle and/or wall following.

Figure 6:
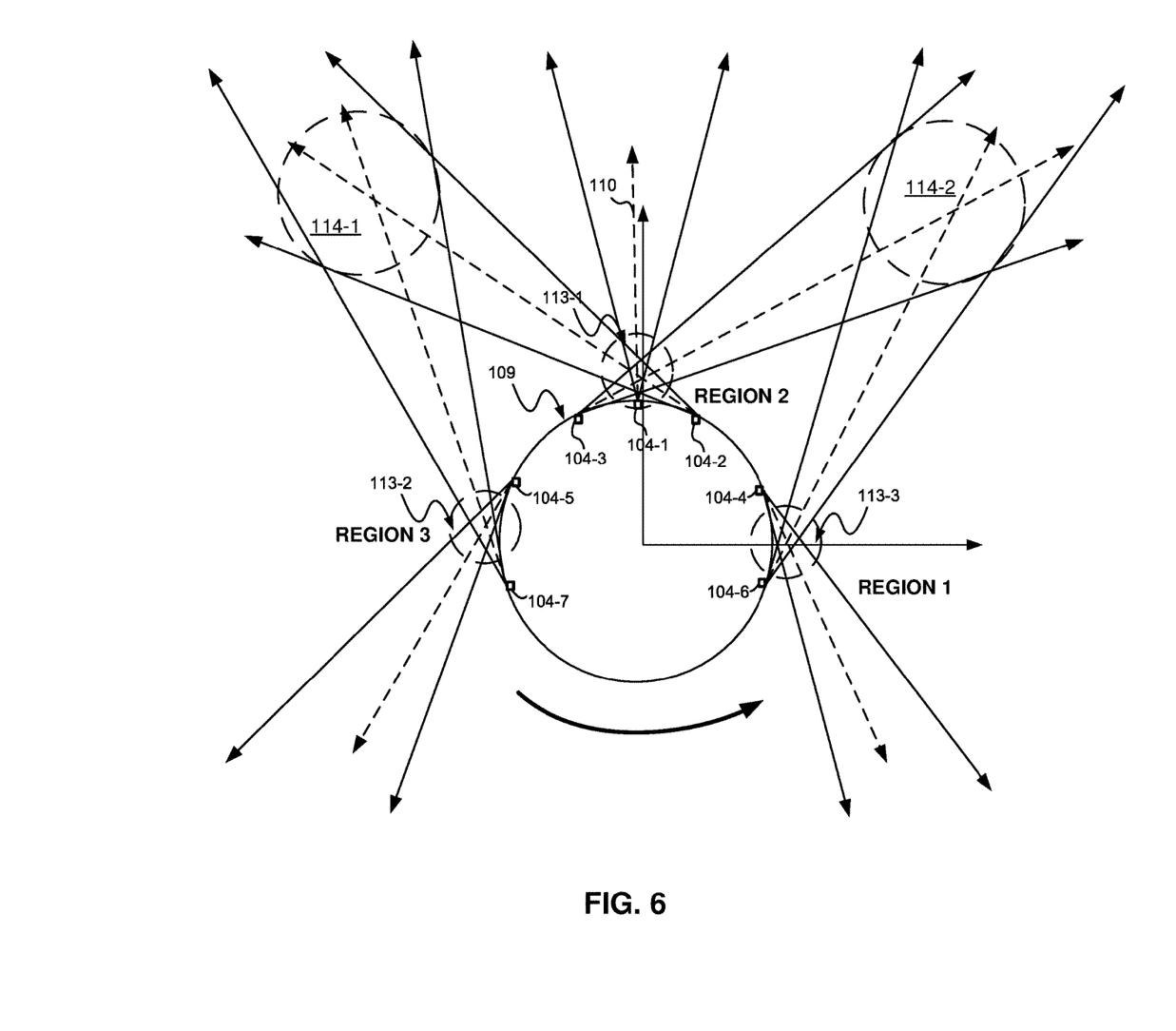
FIG. 6 is another top view of a robot vacuum consistent with an embodiment of the present disclosure.

FIG. 6 shows another example embodiment of the robot 109 consistent with the present disclosure. In this embodiment, the robot 109 may utilize the plurality of ToF sensors 104-1 to 104-7 to perform a pose routine. As referred to herein, the term pose refers to a robots ability to orient itself within a map. Therefore, if the robot rotates 90 degrees about a center axis of its housing, pose refers to the ability to detect, measure and verify that the robot 109 has fully and correctly rotated 90 degrees.

In an embodiment, ToF redundant detection regions (labeled Regions 1 to 3) can be utilized during pose calculations. Consider a scenario where the robot 109 of FIG. 6 detects an object in region 2 using one or more of the aforementioned ToF detection schemes discussed above. Then, the robot initiates a 90 degree rotation to the left (e.g., counter clockwise). The robot 109 may then use Region 1 to positively detect and identify the same object in an estimated window of time based on the executed movement sequence, e.g., based on wheel rotation estimates, real-time wheel encoders, or other suitable approach. Thus, the robot 109 may determine when the movement sequence, e.g., rotation about a center axis of the housing 102 of the robot 109, has completed, and whether the estimates comport with the real-world data received from the ToF sensors. This validation/calibration sequence may therefore be utilized by the robot to calibrate movement systems, detect when the robot is stuck or otherwise impeded, and/or to detect the robot has fully transitioned into a desired orientation within its environment.

In accordance with an aspect of the present disclosure a robotic surface cleaning device is disclosed. The robotic surface cleaning device comprising a housing, a motor coupled to at least one wheel to drive the robot, at least a first Time of Flight (ToF) sensor and a second ToF sensor coupled to the housing, the first and second ToF sensors having a first and a second field of view (FOV), respectively, the first and second FOV at least partially overlapping each other to form a first redundant detection region, a navigation controller disposed in the housing, the navigation controller to receive a first and second measurement signal from the first and second ToF sensors, respectively, and detect an object based, at least in part, on the first and second measurement signals indicating a presence of an object within the first redundant detection region.

In accordance with another aspect of the present disclosure a robotic surface cleaning device to navigate in a surrounding environment to perform cleaning operations is disclosed. The robotic surface cleaning device comprising a housing with a first plurality of Time of Flight (ToF) sensors to identify and/or track objects in an environment surrounding the housing, wherein at least a first and a second ToF sensor of the first plurality of ToF sensors have detection regions at least partially overlapping each other to form a first redundant detection region, and a controller disposed in the housing to determine a location of an object in the surrounding environment relative to the housing based at least in part on the first redundant detection region.

In accordance with another aspect of the present disclosure a computer-implemented method for navigation of a robotic surface cleaning device is disclosed. The method comprising establishing at least a first redundant detection region based at least in part on first and second Time of Flight (ToF) sensors having associated detection regions that at least partially overlap each other, receiving, by a controller, first and second measurement signals from the first and second ToF sensors, respectively, and detecting, by the controller, a location of an object relative to the robotic surface cleaning device based on the first and second measurement signals indicating presence of the object within the first redundant detection region.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A robotic surface cleaning device comprising:
a housing;
a motor coupled to at least one wheel to drive the robotic surface cleaning device;
a first plurality of Time of Flight (ToF) sensors comprising at least a first ToF sensor and a third ToF sensor coupled to the housing;
a second plurality of ToF sensors comprising at least a second ToF sensor and a fourth ToF sensor coupled to the housing,
the first and second ToF sensors being vertically offset relative to each other and having a first and a second field of view (FOV), respectively, the first and second FOV vertically overlapping each other to form a first redundant detection region; and
the third and fourth ToF sensors being vertically offset relative to each other and having a third and fourth FOV, respectively, the third and fourth FOV vertically overlapping each other to form a second redundant detection region; and
a navigation controller disposed in the housing, the navigation controller to:
receive a first and second measurement signal from the first and second ToF sensors, respectively;
detect an object based, at least in part, on the first and second measurement signals indicating a presence of the object within the first redundant detection region;
cause the robotic surface cleaning device to rotate in place according to a rotation direction for a predetermined rotation angle;
receive a third and fourth measurement signal from the third and fourth ToF sensors, respectively;

detect the object based, at least in part, on the third and fourth measurement signals indicating a presence of the object within the second redundant detection region;

track movement of the object between the first redundant detection region and the second redundant detection region based, at least in part, on the first, second, third, and fourth measurement signals;

determine an actual rotation angle through which the robotic surface cleaning device rotated based, at least in part, on the tracked movement of the object; and compare the actual rotation angle to the predetermined rotation angle to determine a difference between the actual rotation angle and the predetermined rotation angle.

2. The robotic surface cleaning device of claim 1, wherein the first and second ToF sensors are infrared-type ToF sensors.

3. The robotic surface cleaning device of claim 1, wherein each ToF sensor of the first plurality of ToF sensors is vertically offset relative to a corresponding ToF sensor of the second plurality of ToF sensors.

4. The robotic surface cleaning device of claim 1, wherein the first and second ToF sensors are arranged in a first staggered configuration such that a first imaginary line drawn substantially transverse from a surface to be cleaned intersects with the first ToF sensor does not intersect with the second ToF sensor.

5. The robotic surface cleaning device of claim 1, wherein navigation controller is further to calculate a height of the object relative to the robotic cleaning device based, at least in part, on the geometry of the first redundant detection region and the relative distance between the robotic cleaning device and the object.

6. The robotic surface cleaning device of claim 1, wherein navigation controller uses the first and second ToF sensors during a pose routine to determine an orientation of the robotic surface cleaning device in a map stored in a memory of the robotic surface cleaning device.

7. A robotic surface cleaning device to navigate in a surrounding environment to perform cleaning operations, the robotic surface cleaning device comprising:
a housing having:
a first plurality of Time of Flight (ToF) sensors to identify and/or track an object in an environment surrounding the housing, the first plurality of ToF sensors having at least a first and a second ToF sensor being vertically offset relative to each other, the first and second ToF sensors having detection regions that at least partially vertically overlap each other to form a first redundant detection region; and
a second plurality of ToF sensors to identify and/or track objects in the environment, the second plurality of ToF sensors having a third and a fourth ToF sensor being vertically offset relative to each other, the third and fourth ToF sensors having detection regions that at least partially vertically overlap each other to form a second redundant detection region; and
a controller disposed in the housing to:
determine a location of the object in the surrounding environment relative to the housing based, at least in part, on the first redundant detection region;
cause the robotic surface cleaning device to rotate in place according to a rotation direction for a predetermined rotation angle;
track movement of the object between the first redundant detection region and the second redundant detection region;
determine an actual rotation angle through which the robotic surface cleaning device rotated based, at least in part, on the tracked movement of the object; and
compare the actual rotation angle to the predetermined rotation angle to determine a difference between the actual rotation angle and the predetermined rotation angle.

8. The robotic surface cleaning device of claim 7, wherein at least one ToF sensor of the second plurality of ToF sensors has a detection region that at least partially overlaps with the detection region of the first and/or second ToF sensor to provide a third redundant detection region, and wherein the controller is further to calculate a height of the object based on the object being detected in the third redundant detection region.

9. A computer-implemented method for navigation of a robotic surface cleaning device, the method comprising:
establishing at least a first redundant detection region based, at least in part, on a first plurality of Time of Flight (ToF) sensors comprising a first ToF sensor and a second ToF sensor, the first and second ToF sensors being vertically offset relative to each other and having associated detection regions that at least partially overlap each other;
establishing at least a second redundant detection region based, at least in part, on a second plurality of ToF sensors comprising at least a third ToF sensor and a fourth ToF sensor, the third and fourth ToF sensors being vertically offset relative to each other and having associated detection regions that at least partially overlap each other;
receiving, by a controller, first and second measurement signals from the first and second ToF sensors, respectively;
detecting, by the controller, a location of an object relative to the robotic surface cleaning device based on the first and second measurement signals indicating a presence of the object within the first redundant detection region;
causing the robotic surface cleaning device to rotate in place according to a rotation direction for a predetermined rotation angle;
receiving a third and fourth measurement signal from the third and fourth ToF sensors, respectively;
detecting the object based, at least in part, on the third and fourth measurement signals indicating a presence of the object within the second redundant detection region;
tracking movement of the object between the first redundant detection region and the second redundant detection region based, at least in part, on the first, second, third, and fourth measurement signals
determining an actual rotation angle through which the robotic surface cleaning device rotated based, at least in part, on the tracked movement of the object; and
comparing the actual rotation angle to the predetermined rotation angle to determine a difference between the actual rotation angle and the predetermined rotation angle.

10. The computer-implemented method of claim 9, further comprising calculating, by the controller, a height of an object detected within the second redundant detection region.

11. The computer-implemented method of claim 9, further comprising executing, by the controller, a pose routine that orients the robotic surface cleaning device within a map stored in a memory.

\* \* \* \* \*